Nov. 17, 1942.  E. D. EDDY ET AL  2,302,112
SEED CLEANER
Filed June 6, 1940
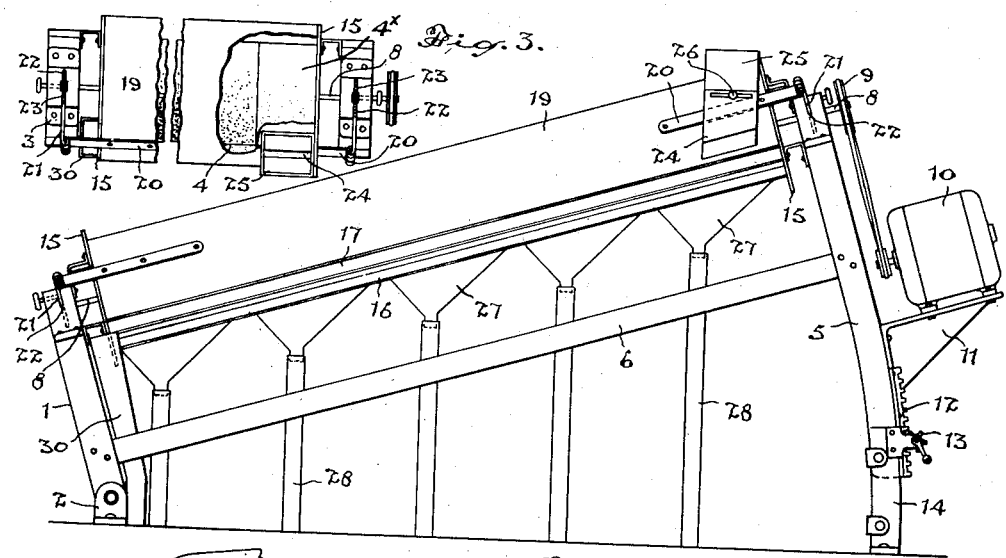
Fig. 3.
Fig. 1.
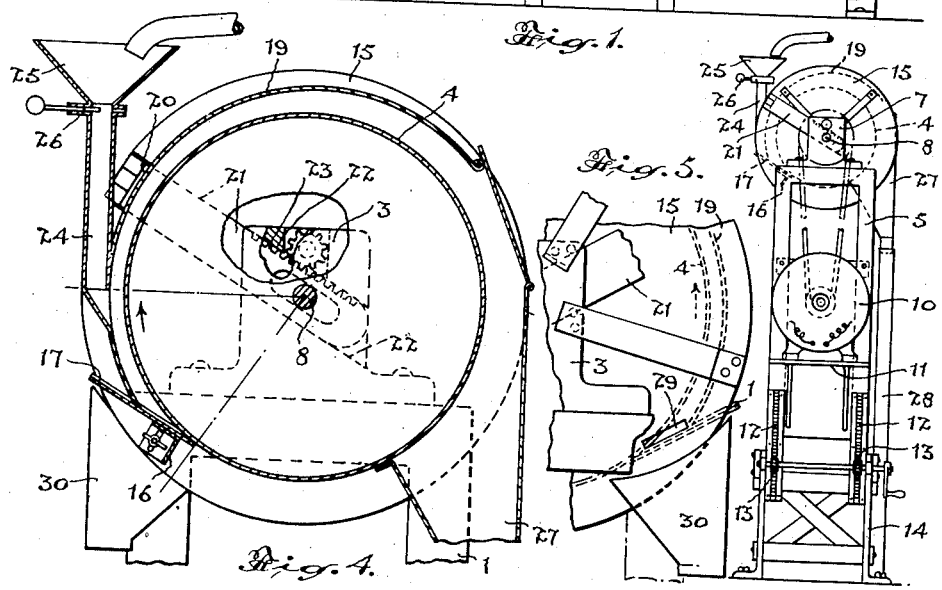
Fig. 5.
Fig. 4.
Fig. 2.
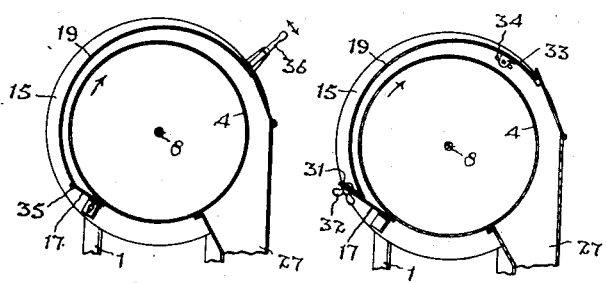
Fig. 7.  Fig. 6.
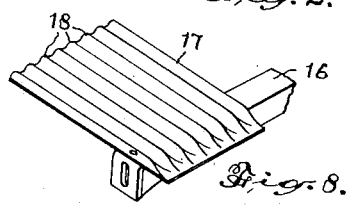
Fig. 8.
Inventors
Edgar D. Eddy.
Albert W. Campbell.

Patented Nov. 17, 1942

2,302,112

UNITED STATES PATENT OFFICE 2,302,112

SEED CLEANER

Edgar D. Eddy and Albert W. Campbell,
Toronto, Ontario, Canada

Application June 6, 1940, Serial No. 339,066

9 Claims. (Cl. 209—78)

The principal objects of this invention are to provide a machine of an extremely simple construction which will effectively separate the seeds of clover, alfalfa, flax, cereals and the like from objectionable seeds, particularly the seeds of weeds of various kinds and inert matter such as sand, clay, pieces of broken grain and other foreign substances.

The principal feature of the invention consists in the novel arrangement of a rotating cylinder having an inclined axis and having its surface covered with a friction material such as cut-pile fabric, rubber, leather or other suitable material to present a friction surface adapted to engage the rough irregular surfaces, of weed seeds, dirt and other foreign matter mixed with smooth-coated seeds to propel the same in an outward and upward direction, the said cylinder having arranged adjacent thereto but spaced therefrom, a substantially concentric part-cylindrical shield extending from a line well below the transverse diameter of the cylinder to a line beyond the vertical diameter thereof, the said shield being adjustably mounted so that the space between the cylinder and shield may be varied to suit the requirements of the seed and foreign matter to be separated.

A further important feature consists in the novel arrangement of a feed conduit having its discharge end directed into the space between the separating cylinder and the shield below the transverse axis of the cylinder.

A further important feature consists in the novel provision of means at the bottom of the space between the cylinder and shield for maintaining close contact with the cylinder surface while permitting the shield to be adjusted and which also will materially assist in the effective separation of the rough surfaced foreign material from the smooth-surfaced seed to be cleaned.

In the accompanying drawing Figure 1 is a side elevational view showing a seed-cleaning machine constructed in accordance with this invention.

Figure 2 is an end elevation of the view shown in Figure 1.

Figure 3 is a plan view partly broken away.

Figure 4 is an enlarged cross sectional view through the cleaner cylinder and separating shield including a section through the feed conduit and one of the discharge hoppers.

Figure 5 is an enlarged elevational detail showing the discharge opening for the cleaned seed.

Figure 6 is a small diagrammatic sectional view showing a modified form of construction for the adjustment of the shield member.

Figure 7 is a small diagrammatic sectional view showing a further modified means of adjusting the shield member.

Figure 8 is a perspective detail of a portion of the preferred form of bottom plate which forms the contact with the rotating cylinder.

In the production of various kinds of seed it is well understood that mixed in with the seed plants is a great variety of weeds and naturally it is found that the weed seeds are mixed in with the good seeds as also is a considerable quantity of foreign matter in the form of sand, dirt and broken seeds which require to be separated out. It is also a well known fact that in general weed seeds such as dodder, white cockle, bladder campion, night-flowering catchfly, field pepper-grass, wild carrot and many other weeds, have a comparatively rough or pitted seed coat, while the seeds of clover, alfalfa, flax and cereals are mostly smooth.

Many different types of devices have been proposed to separate these smooth-surfaced seeds from the rough weed seeds and other foreign matter, and it has been proposed to utilize the brushing quality of rollers covered with pile fabric and similar friction surfaced material.

It has however been the practice in the use of such types of rollers to depend upon the brushing effect of the rollers to pick up the rough-surfaced materials and carry them away from the good seeds and brushing means have then been applied to clear the rough-surfaced rollers of the material picked up, while the smooth-surfaced seeds remain in the bottom of the trough against the roller surface and move toward the discharge through rolling or sliding movement.

The present invention involves a different theory of separation from those which have been practiced and the cylinder is operated with a much higher peripheral speed than has heretofore been used in order that all of the seeds will be kept in suspension and the rough particles contacted by the cylinder surface will be projected more forcibly and thrown clear of the smooth-coated good seeds more effectively. This high speed and the resultant buffeting action carries the smooth-coated seeds to the discharge opening much more rapidly than is possible where the discharge depends upon the seeds rolling or sliding upon the bottom of the separation chamber.

An apparatus for carrying the present invention into effect is illustrated in the accompanying drawing. As shown in Figure 1 a frame structure 1 is pivotally mounted on brackets 2 rigidly secured to the floor. This frame structure supports a journal bearing 3 for one end of the spindle of the rotatable cylinder 4.

A frame 5, here shown rigidly connected with the frame 1 by means of the longitudinal bar 6, carries a journal support 7 for the cylinder drive shaft 8 which is here shown provided with a pulley 9 driven by a motor 10 mounted on a bracket 11 on said frame. The lower legs of the frame 5 are preferably curved to a radius centered on the hinge supports of the frame 1 and they are provided with a toothed rack 12 which is engaged by a pinion 13 mounted in a floor bracket 14, so that by the turning of the pinion the racks may be raised or lowered to alter the angularity of the cylinder 4 and the parts carried therewith.

Stationary flanges 15 are mounted on the end frame and abut the ends of the cylinder. A bar 16, shown in Figure 4 as of angle formation, extends between the end flanges 15 substantially parallel with the axis of the cylinder and said bar is adjustably supported at its ends in the flanges so that it can be moved closer to or farther from the periphery of the cylinder.

Mounted on the bar 16 is a plate 17 which is supported in tangential relation to the cylinder. This plate is preferably formed with a plurality of transverse corrugations 18. A substantially semi-cylindrical shield 19 extends from end-to-end of the cylinder and is spaced therefrom. This shield is supported at the ends by bars 20 which extend beyond the flanges 15 and are hingedly connected to bars 21 which are slidably mounted in angularly disposed guideways 22 arranged on the end frames.

Each of the bars 21 is preferably slotted and the drive shaft and spindle support of the cylinder extend through the slots. The bars 21 are also formed with rack teeth 23 (see dotted line Figure 4) which are engaged by a pinion mounted in the end frame and by means of which the bars may be adjusted inwardly or outwardly to vary the spacing of the internal surface of the shield from the external surface of the cylinder.

The surface of the cylinder is preferably covered with a pile fabric such as velvet and this pile surface travels practically in contact with the lower edge of the plate 17 carried by the bar 16. Friction surface coatings other than pile fabrics may be used for certain classes of seeds and a leather or rubber cover is found desirable in some instances.

A feed chute 24 is arranged at the upper and driven end of the device and this opens through the shield 19 at a point preferably below the horizontal diametral line of the cylinder so that the seeds will be fed in to the space between the cylinder and the shield in such a manner as to be poured down onto the bottom plate 17, which being arranged at an acute angular position in relation to the periphery, carries the seeds into contact with the swiftly-moving peripheral surface of the cylinder. The feed member 24 is provided with a suitable hopper 25 and a suitable regulating valve 26 to control the flow of seeds to the inlet.

At the side of the cylinder opposite to the side adjacent to the plate 17 are arranged a plurality of hoppers or chutes 27 to receive the weed seeds and other refuse which may be separated from the good seeds. These hopper chutes are provided with suitable conveyor tubes 28.

A discharge opening 29 is arranged in the flange at the lower end of the cylinder, said opening being parallel with the plate 17, and the cleaned seed, which eventually works down to the lower end of the machine, flows out through this opening into the feed chute 30.

In operating this machine the seed, which is preferably cleaned of chaff and light material separable in a fan, is fed in to the upper end of the space between the cylinder 4 and the shield 19.

As has been stated, the discharge end of the feed chute is below the horizontal centre of the cylinder. Consequently the inflowing seed will mostly drop to the bottom of the space between the shield and the cylinder and be carried down into contact with the cylinder by the plate 17.

The peripheral speed of the cylinder, which rotates in the direction indicated by arrows in Figure 4, is regulated so that practically all of the seed is held in suspension and is kept bouncing back and forth between the cylinder surface and the shield, while moving along the length of the separation chamber to the discharge. At each contact with the cylinder the rough-surfaced particles receive a greater impetus than the smooth-surfaced seeds, and rebound from the shield back to the cylinder at a slightly higher point. This action is repeated many times and the refuse particles are lifted substantially vertically from the plate 17 up past the centre line of the cylinder and around the cylinder to the waste discharge hoppers 27.

The smooth-coated seeds, making a lighter frictional contact with the cylinder, are not carried as high as the rough-surfaced particles, but are kept rebounding between the cylinder and the shield in an area mostly below the centre line of the cylinder and are rapidly carried to the lower and discharge end of this area.

It has been found that the use of a part of the cylinder surface below the horizontal centre line and the lifting of the rough-surfaced particles a considerable distance vertically against the force of gravity, by repeated buffeting between shield and cylinder, make possible much better separations and greater capacity than have hitherto been obtained.

It will be noted that the shield is supported by the obliquely disposed supporting arms 21 and these arms are substantially parallel to the tangentially arranged plate 17, and by manipulation of the pinions engaging the rack surfaces of the arms 21 the shield may be moved outwardly or inwardly with its bottom edge engaging and sliding on the plate 17 so that the adjustment may be carried on while the machine is in operation in order to achieve the best results at the speed of operation chosen.

It has been stated that the plate 17 is preferably transversely corrugated. This corrugation is desirable in that as long pointed weed seeds fall upon it the tendency is for the corrugations to cause the seeds to slide inwardly toward the cylinder surface with their pointed ends pointing toward the cylinder. This has the effect of bringing the point of the seeds in contact with the friction cylinder surface thus giving them a greater velocity than would be the case if their side areas engage the cylinder surface, which greatly assists the thrusting of such seeds clear of the smooth-surfaced good seeds. The corrugations also have the effect of retarding sliding movement of the seeds from the feed end to the discharge end and ensuring the good seeds being maintained in suspension and thereby carried more quickly to the discharge while ensuring that refuse matter will not be enclosed in sliding masses of seed.

The upper end 4ˣ of the cylinder may be provided with a surface of finer or harder texture, extending to a point beyond the feed chute 24, as illustrated in Figure 3, where the upper end of the shield 19 is broken away to show this construction. The machine may then be operated without any feed regulating slide 26, the feed tube 24 remaining full of seed and the rate of feed being automatically determined by the speed and slope of the cylinder and the radial spacing of the shield therefrom. The finer surface at the upper end of the cylinder prevents loss of good seed at this point, before the buffeting action of the seed between the shield and cylinder and its longitudinal motion towards the discharge end have become established.

On reference to Figures 6 and 7 it will be noted that two different and very simple forms of adjustment to the shield are shown. In Figure 6 the lower edge of the shield is provided with a flange 31 which is secured to plate 17 in adjustable positions by means of the lock nuts 32. The upper edge of the shield is supported by lugs 33 which engage with bolts slidable in slots 34 in the end flanges.

In the form shown in Figure 7 the shield is shown hinged at the outer edge 35 of the plate 17 and the upper edge of the shield is supported by a toggle lever 36 which may be operated to change the relative position between the shield and the cylinder.

It may be found desirable to coat the inner surface of the shield 19 with a suitable friction or resilient material such as emery cloth or rubber to prevent an excessive sliding action when the seeds are thrown outwardly against the shield. Such provision will ensure that the seeds are buffeted between the walls of the chamber and the cylinder sufficiently to effect the desired separation.

It will be further noted that the shield may be adjusted inwardly or outwardly to different degrees at the opposite ends and by this flexibility of adjustment the spacing may be made effective to control the character of the material thrown out at various points along the length of the cylinder. These adjustments may of course be made while the machine is in operation and the speed of the cylinder may be regulated in the course of operation so as to obtain the best results, thereby ensuring an accurate control of the separation.

In the preferred form of our apparatus, the cylinder is approximately six inches in diameter and it operates effectively at peripheral speeds of from 700 to 1200 feet per minute which is several times faster than the speed employed in other types of machines. In practice it has been found that this apparatus in the separation of clover seeds has an effective capacity of from 75 to 150 pounds per hour as against the normal operation capacity of other known types of units of from 20 to 30 pounds per hour. It is understood, of course, that a plurality of separating units such as shown and described herein will be arranged in a machine for commercial use.

What we claim as our invention is:

1. A seed cleaner comprising a friction-surfaced cylinder mounted on an inclined axis, a part cylindrical shield spaced from the surface of said cylinder and extending from a line below the horizontal diameter of the cylinder and over the top thereof, means extending inwardly from the bottom of said shield to close the space between the shield and the cylinder, the lower portion of said shield and the means extending therefrom forming with the cylinder a well defined seed-receiving chamber extending well below the level of the cylinder axis, and means for feeding seeds into said chamber at or below the level of the cylinder axis.

2. A seed cleaner comprising a cleaning cylinder having a friction surface and mounted on an inclined axis, means for rotating said cylinder, a plate rigidly mounted at a slight incline to the horizontal and arranged in tangential relation to the upwardly and outwardly rotating side of the cylinder surface well below the horizontal diameter thereof so that a substantial portion of the said side of the cylinder overhangs the same, a part cylindrical shield adjustably spaced from said cylinder having its lower edge in engaging contact with said tangential plate and its upper edge extending over the top of the cylinder, means for releasing seeds to be cleaned into the space formed between said plate and the overhanging upwardly and outwardly rotating side of the cylinder, and means arranged at either end of said shield for adjusting its spacing from the periphery of the cylinder.

3. In a seed cleaner, having a tiltable frame, a shaft mounted in said frame, a cylinder mounted on said shaft and having a friction surface, and a part cylindrical shield arranged adjacent to one side of said cylinder and extending over the top thereof, bars mountd one at each end of the frame for radial sliding displacement relative to the cylinder and flexibly connected to said shield at their outer ends, means for adjusting said bars radially to adjust the spaced relation between the periphery of the cylinder and said shield, said part cylindrical shield extending well below the horizontal level of the cylinder axis, a plate extending from the lower edge of said shield into engagement with the adjacent underside of the periphery of the cylinder and closing the space between the cylinder and shield, and means for feeding seeds into the space between the cylinder and shield.

4. A seed cleaner as claimed in claim 1 in which said shield and space-closing means are mounted for adjustment relative to each other and/or to the cylinder, and means for securing same in their relatively adjusted relations.

5. A seed-cleaning machine of the type having upwardly diverging surfaces forming a trough-like pocket therebetween for the reception and classification of seeds and being relatively displaceable to direct undesired seeds upwardly and away from said pocket, in which said diverging surfaces comprise respectively a frictionally surfaced cylinder and a corrugated metal plate arranged to present the said trough-like pocket well below the level of the cylinder axis, the plate having the corrugations terminated short of the bottom extremity thereof to form a smooth lip portion for substantial pocket-sealing cooperation with the frictional upwardly and outwardly rotating undersurface of the cylinder.

6. A seed-cleaning machine of the type having upwardly diverging surfaces forming a trough-like pocket therebetween for the reception and classification of seeds and being relatively displaceable to direct undesired seeds upwardly and away from said pocket, characterized in that said diverging surfaces comprise in combination a rotating frictional surface and a stationary plate tangentially related to an upwardly and outwardly rotating portion of the said rotating frictional surface, and a seed-deflecting shield plate extending from said tangential plate in substantial concentric conformity to the rotating surface and treated for frictional surface contact with seeds thrown thereagainst by said rotating surface to control the sliding deflection thereof.

7. A seed-cleaning machine as claimed in claim 6 in which said shield is rubber-surfaced to control the seed deflection.

8. A seed-cleaning machine as claimed in claim 6 in which said shield is surfaced with an abrasive material.

9. A seed cleaner of the type in which the seed to be cleaned, classified or separated is introduced into a trough-like pocket presented between spaced surfaces at least one of which comprises a frictionally surfaced cylinder, characterized in that the cylinder surface is of more pronounced frictional character at one end than the other, a good seed discharge at the more frictional end of the cylinder, the other spaced surface comprising a shield conforming substantially to the curvature of the cylinder in embracing relation to both the less frictional area as well as the more frictional portions of the cylinder, and seed-introducing means entering said pocket through the shield in alignment with the less frictional area of said cylinder.

EDGAR D. EDDY.
ALBERT W. CAMPBELL.